United States Patent
Linger

[19]

[11] Patent Number: 6,105,989
[45] Date of Patent: Aug. 22, 2000

[54] ANTI-RATTLE DEVICE FOR RECEIVER-STYLE HITCH

[75] Inventor: Don F. Linger, Stockton, Calif.

[73] Assignee: Valley Industries, LLC, Madison Heights, Mich.

[21] Appl. No.: 09/093,700

[22] Filed: Jun. 8, 1998

Related U.S. Application Data

[60] Provisional application No. 60/064,208, Nov. 4, 1997.

[51] Int. Cl.[7] ...................................................... B60D 1/00
[52] U.S. Cl. .......................................... 280/506; 403/362
[58] Field of Search ................................ 280/506, 491.5, 280/504; 403/362, 378; 224/521, 519, 518

[56] References Cited

U.S. PATENT DOCUMENTS

| | | |
|---|---|---|
| 2,639,160 | 5/1953 | Studebaker et al. . |
| 2,685,468 | 8/1954 | Blocker et al. . |
| 4,050,714 | 9/1977 | Epp . |
| 4,072,257 | 2/1978 | Hall . |
| 5,025,932 | 6/1991 | Jay . |
| 5,344,175 | 9/1994 | Speer ........................................ 280/506 |
| 5,423,566 | 6/1995 | Warrington et al. ..................... 280/504 |
| 5,562,298 | 10/1996 | Kass et al. ............................... 280/504 |
| 5,593,172 | 1/1997 | Breslin . |
| 5,615,904 | 4/1997 | Van Dusen et al. . |
| 5,735,539 | 4/1998 | Kravitz .................................... 280/506 |
| 5,988,667 | 11/1999 | Young ..................................... 280/506 |

FOREIGN PATENT DOCUMENTS 2235668  3/1991  United Kingdom ................... 280/506

*Primary Examiner*—Daniel G. DePumpo
*Attorney, Agent, or Firm*—Rader, Fishman & Grauer PLLC

[57] ABSTRACT

A device for eliminating rattle in a receiver-type hitch due to movement between hitch components includes a collar, an adjustment bolt, a lock nut and a second nut. The collar has a center wall and two side walls forming a U-shaped bracket that can fit over a reinforcing lip of the hitch receiver tube. A front wall on the collar has an opening for receiving a mount shank as it enters the receiver tube. An adjustment bolt extends through the center wall to tighten the collar onto the hitch receiver tube. When the adjustment bolt is tightened, the center wall of the collar moves away upward away from the receiver tube, causing the opening in the front wall to lift the shank against the inner wall of the tube and prevent it from moving within the tube. The lock nut then holds the entire anti-rattle assembly into position. Thus, the anti-rattle device prevents hitch rattling with a minimum of components.

20 Claims, 2 Drawing Sheets

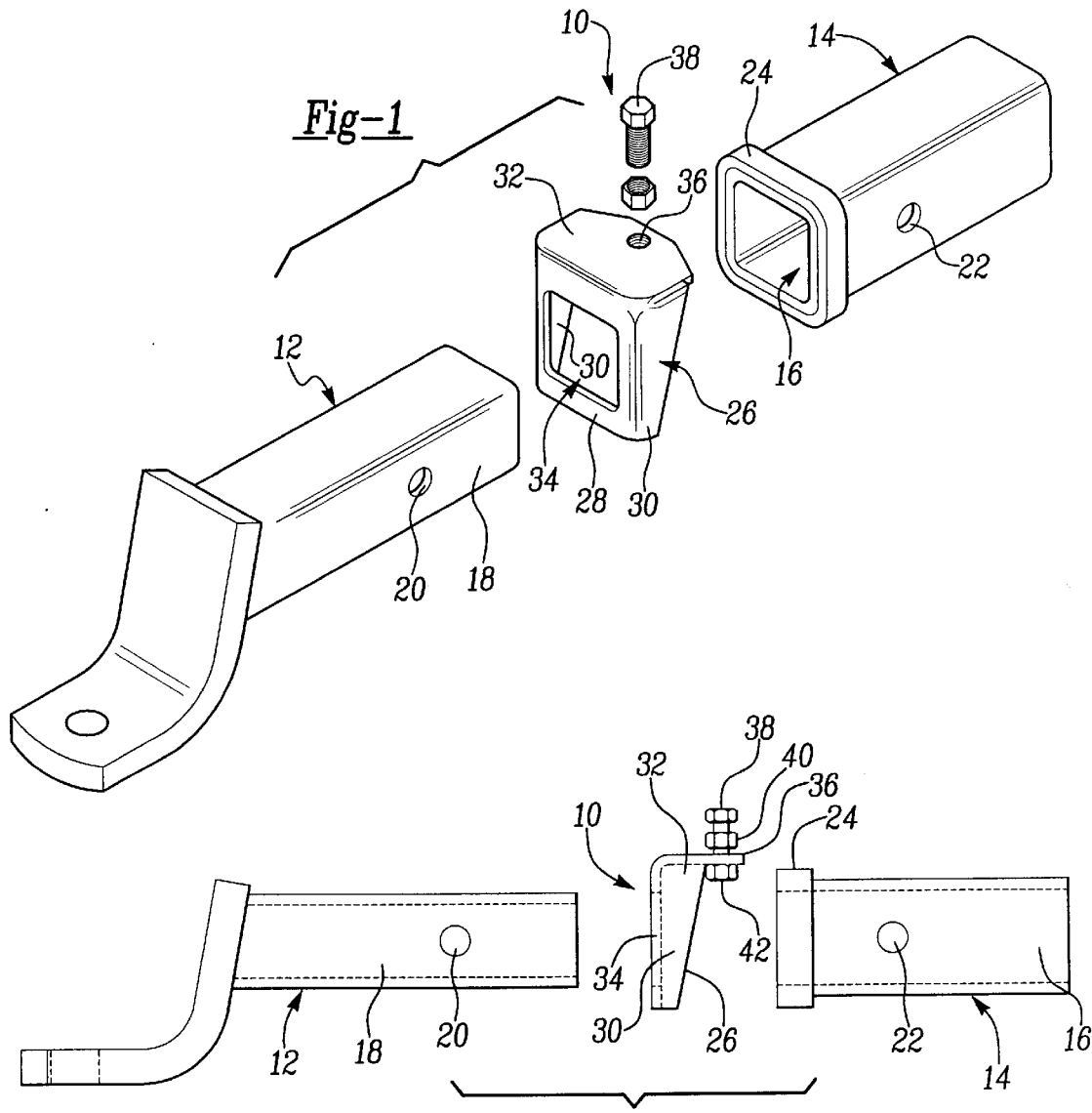
Fig-1
Fig-2
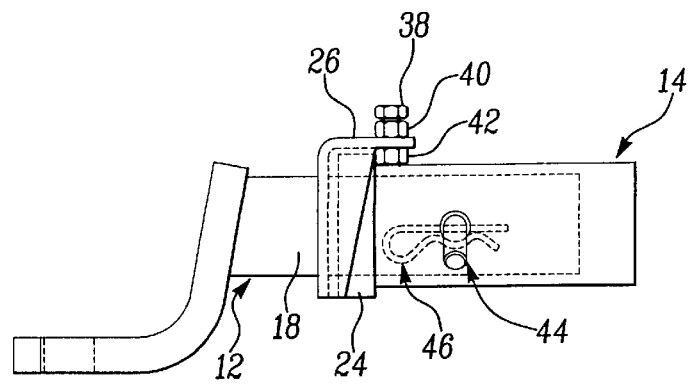
Fig-3

ANTI-RATTLE DEVICE FOR RECEIVER-STYLE HITCH

This application claims the benefit of U.S. Provisional Application No. 60/064,208 filed on Nov. 4, 1997.

TECHNICAL FIELD

The invention is related to receiver-style hitches and more specifically to devices for eliminating rattling due to movement of connecting parts in the hitch.

BACKGROUND ART

Receiver-type hitches are commonly used to secure a trailer to a vehicle or used in bicycle racks or ski racks. Receiver-type hitches typically include a receiver tube and a ball mount that can be placed into and removed from the receiver tube. The ball mount has a shank having a generally square cross-section that fits within the receiver tube. A pin is then inserted through the tube and shank to lock the ball mount to the tube. The receiver tube is slightly larger than the shank to promote engagement with the ball mount shank. As a result, however, the hitch tends to rattle as the shank selectively engages the inside walls of the receiver tube. Accordingly, various devices have been proposed to eliminate the rattling.

One known device includes a square collar having a square opening for receiving the tube. The collar slides over the end of the receiver tube and is attached to the tube with three bolts. The collar has a portion that extends outwardly from the end of the receiver tube. The shank is received through the collar's extended portion and the tube. A threaded member, which is turned by a knob, extends through the collar extension. The threaded member is used to apply a lateral force to the shank to force the portion in the tube against the side of the receiver tube, preventing movement of the shank within the tube. Installing such a device can be time-consuming, however, because it requires insertion of three bolts and manual adjustment of the threaded member. Accordingly, there is a need for a trailer hitch assembly that has fewer parts for quicker, more efficient installation and adjustment.

SUMMARY OF THE INVENTION

The present invention is an anti-rattle device for preventing rattling of mounts such as a trailer hitch by securing the position of a mount shank within a hitch receiver tube. The device includes a collar having a front plate with an aperture for receiving the mount shank, side plates and a center plate that contains a threaded throughbore for receiving an adjustment bolt. The plates of the collar are shaped to fit over a reinforcing lip on the receiver tube, and the center plate is large enough to cover the reinforcing lip completely.

When attaching a device such as a trailer to a vehicle, the mount shank is inserted through the front plate aperture of the collar into the receiver tube. A pin is then inserted through corresponding holes in both the shank and the receiver tube to secure the two components together. To hold the shank and receiver tube together tightly enough to prevent rattling, a lock nut is placed over the throughbore on the center plate and a second nut is placed in between the center plate and the outside wall of the receiver tube. Both nuts are arranged to receive an adjustment bolt. The adjustment bolt is then threaded through the lock nut into the throughbore of the collar and through the second nut on the other side. When the adjustment bolt is tightened, it displaces the center wall outward away from the receiving tube, drawing the aperture of the collar against the shank. The displacement forces the shank against the inside wall of the receiver tube, thereby preventing rattling caused by movement of the shank inside the tube. Thus, the present invention effectively prevents rattling even though only one adjustment bolt is used in the anti-rattle device of the invention.

BRIEF DESCRIPTION OF THE DRAWINGS

FIG. 1 is an exploded perspective view of the anti-rattle device of the present invention and the mount and hitch receiver tube being secured by the anti-rattle device;

FIG. 2 is a side view of the anti-rattle device of the present invention before the hitch is assembled;

FIG. 3 is a side view of the hitch and the anti-rattle device of the present invention after the hitch is assembled and before the adjustment bolt is tightened;

DETAILED DESCRIPTION OF THE PREFERRED EMBODIMENT

Figure 4A:
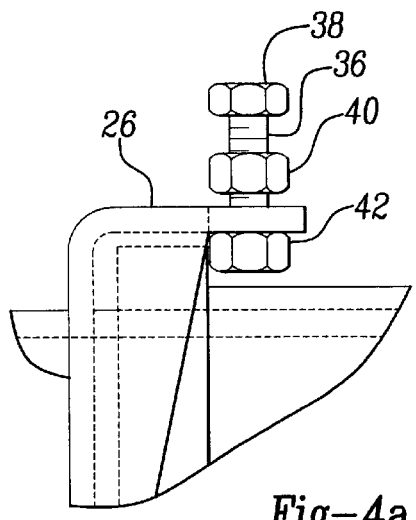
FIGS. 4A and 4B are close-up side views of the hitch and the anti-raffle device of the present invention both before and after the adjustment bolt is tightened.

Referring to FIGS. 1 and 2, an anti-rattle device 10 according to the present invention is designed for use with a receiver-type hitch having a mount 12 and a generally square hitch receiver tube 14. Mount 12 is shown with an aperture adapted to receive a ball. However, mount 12 may include other types of devices such as bicycle and ski racks. The hitch receiver tube 14 has a generally square opening 16 for receiving a shank portion 18 of the mount 12. Both the shank 18 and the receiver tube 14 have corresponding through holes 20, 22 that line up with each other when the shank 18 is in a proper orientation within the receiver tube 14. The receiver tube 14 is formed of a hard metal, such as steel, and has a reinforcing lip 24 disposed around the opening 16 of the tube 14 for added strength. The lip 24 is preferably formed from a ¼-inch wide steel strip having a thickness approximately equal to the wall thickness of the tube 14. The lip 24 should extend around all four sides of the opening 16 in the receiver tube 14. The steel strip forming the lip 24 can be attached to the receiver tube 14 using any known means, such as welding.

The anti-rattle device 10 itself preferably comprises a collar 26 having a front wall 28, a pair of side walls 30 and a center wall 32, each wall 28, 30, 32 extending orthogonally to the front wall 28. The front wall 28 of the collar 26 has a generally square opening 34 having dimensions that are slightly larger than the dimensions of the mount shank 18 to accommodate the shank 18 as it passes therethrough into the receiver tube opening 16. As can be seen in FIG. 1, the two side walls 30 extend orthogonally from the front wall 28 on opposite sides of the front wall 28. The side walls 30 can be somewhat smaller or narrower than the center wall 32 if desired. The center wall 32 and side walls 30 together form a U-shaped cover that can slide over the lip 24 of the receiver tube 14.

The collar 26 can be formed by stamping a sheet of steel to obtain the desired dimensions and then bending the side walls 30 and center wall 32 at substantially right angles relative to the front wall 28 into their corresponding orthogonal positions. The edges of the side walls 30 can then be welded to the edges of the center wall 32.

Once the collar 26 is in place on the receiver tube 14, the center wall 32 and side walls 30 cover three sides of the receiver tube 14 with the opening 34 of the front wall 28 aligned with the opening 16 of the receiver tube. The two openings 34, 16 together receive the shank 18 of the mount 12 as it is inserted into the hitch receiver tube 14. To allow the collar 26 to be adjusted and tightened, a threaded throughbore 36 extends through the center wall 32 to accommodate an adjustment bolt 38. The throughbore 36 is positioned on the center wall 32 so that the adjustment bolt 38 will contact the receiver tube 14 behind the reinforcing lip 24 once the bolt 38 is inserted, as shown in FIG. 3.

As best shown in FIGS. 2, 3 and 4A, rattle-free connection between the mount shank 18 and the receiver tube 14 is conducted by first placing the collar 26 of the anti-rattle device 10 over the lip 24 of the receiver tube 14. At this time, the adjustment bolt 38 should already be screwed partially into the throughbore 36 to hold a lock nut 40 and a second nut 42 to the collar 26. The lock nut 40 and second nut 42 are placed on either side of the center wall 32 to sandwich the center wall 32 therebetween. The shank 18 of the mount 12 is then inserted through the collar opening 34 into the receiver tube opening 16. A hitch pin 44 is inserted through the through holes 20, 22 in both the receiver tube 14 and the shank 18 to hold the mount 12 in its proper towing position. A hair pin 46 is then wedged over the hitch pin 44 to secure the hitch pin's position and prevent it from vibrating loose out of the through holes 20, 22.

Figure 4B:
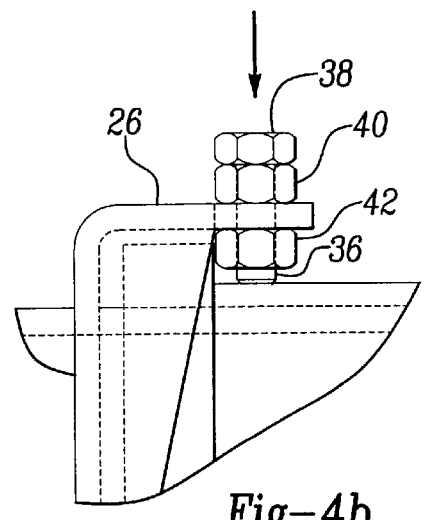

Once the mount 12 is secured inside the hitch receiver tube 14, the second nut 42 is disposed in between the receiver tube 14 and the center wall 32 of the collar 26, and the lock nut 40 is disposed between the center wall 32 of the collar 26 and the head of the adjustment bolt 38. At this point, the slight dimensional differences between the shank 18 and the receiver tube 14 allow the shank 18 to move slightly within the tube 14, causing selective rattling. To anchor the shank 18 in place and eliminate the rattling, the adjustment bolt 38 can be tightened, moving the bolt 38 inwardly toward the receiver tube 14. The tightening action of the bolt 38 moves the collar 26 closer toward the head of the bolt 38, displacing the center wall 32 of the collar outwardly away from the wall of the hitch receiver tube 14, as shown in FIG. 4B. The outward movement of the center wall 32 draws the square opening 34 of the collar 26 against the shank 18 of the mount 12 to force the shank 18 against an inner wall of the hitch receiver tube 14. The lock nut 40 is then tightened against the center wall 32 to hold the components of the anti-rattle device 10 in place. By using the anti-rattle device 10, all movement between the shank 18 and the receiver tube 14 will be eliminated and all noise due to movement will likewise be eliminated with a minimum of components.

Figure 5A:
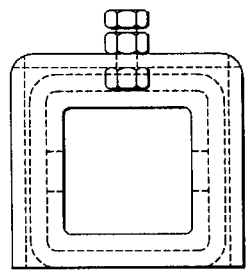
FIGS. 5a through 5d show various possible mounting positions for the anti-rattle device of the invention.
Figure 5B:
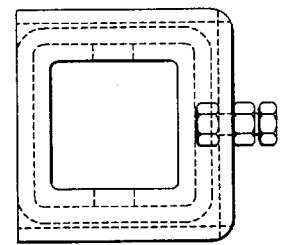
Figure 5C:
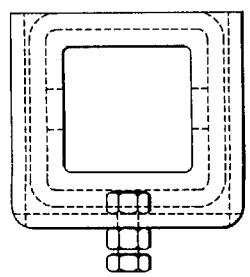
Figure 5D:
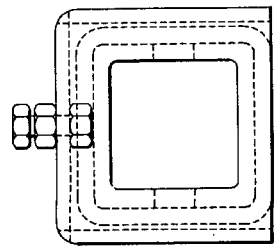

The actual positioning of the anti-rattle device 10 relative to the hitch receiver tube 14 and the mount 12 does not matter. Thus, if the device 10 cannot be easily adjusted in one particular position, the user has the option of repositioning the device 10 into a more convenient position. As a result, the device 10 allows much greater flexibility and ease of use than previously known devices. FIGS. 5a through 5d show examples of different orientations for the anti-rattle device 10. FIG. 5a illustrates a top mounted collar 26, which was used as an example in the detailed description above. In this orientation, the center wall 32 and the adjustment bolt 38 engage the top surface of the receiver tube 14 so that the bolt tightening action lifts the shank 18 upward as the center wall 32 moves away from the receiver tube 14. FIGS. 5b and 5d show side mounts of the collar 26 where the center wall 32 and the adjustment bolt 38 are on the side of the receiver tube 14. Similarly, FIG. 5c shows the center wall 32 and the adjustment bolt 38 positioned at the bottom of the receiver tube 14 so that the bolt tightening draws the collar 26 downward. In all of these orientations, the structure of the inventive anti-rattle device 10 and the manner in which the components work are the same.

It should be understood that various alternatives to the embodiments of the invention described herein may be employed in practicing the invention. It is intended that the following claims define the scope of the invention and that the methods and apparatus within the scope of these claims and their equivalents be covered thereby.

What is claimed is:

1. An anti-rattle device for use with a receiver-style hitch having a receiver tube and a mount, the device comprising:
   a collar having a front wall and a center wall extending orthogonally from an edge of the front wall, and at least one side wall orthogonal to the front wall and the center wall, the front wall having an opening to receive the mount therethrough, the center wall having a threaded throughbore;
   an adjustment bolt extending through the throughbore in the center wall to contact the receiver tube, said adjustment bolt being movable within the throughbore to move the center wall of said collar away from the receiver tube to draw the opening in the front wall against a shank portion of the mount and force the shank portion of the mount against an inner wall of the receiver tube; and
   mounting means coupled with said adjustment bolt to maintain the position of said collar on the receiver tube.

2. The device of claim 1, wherein said collar includes two side walls, each extending orthogonally from opposite edges of the front wall.

3. The device of claim 2, wherein said collar is formed by stamping a flat piece of metal, bending the flat piece of metal at substantially right angles to form the center walls and the side walls, and welding the center wall and the side walls thus formed at their respective edges.

4. The device of claim 1, wherein said mounting means includes a lock nut and a second nut, said second nut being positioned in between said center wall and a wall of the receiver tube, wherein said adjustment bolt is threaded through said lock nut and through the throughbore in the center wall into said second nut and wherein said lock nut is tightened against said center wall to maintain the position of the collar on the receiver tube.

5. The device of claim 1, wherein the device is placed on the receiver tube such that the center wall and the adjustment bolt are located on a top surface of the receiver tube.

6. The device of claim 1, wherein the device is placed on the receiver tube such that the center wall and the adjustment bolt are located on a side surface of the receiver tube.

7. The device of claim 1, wherein the device is placed on the receiver tube such that the center wall and the adjustment bolt are located on a bottom surface of the receiver tube.

8. A system for preventing rattling in a hitch, comprising:
   a mount having a shank portion;
   a receiver tube shaped to receive the shank portion of said mount;
   a collar having
      a front wall,
      a center wall extending orthogonally from an edge of the front wall, the front wall having an opening to receive the shank portion of said mount therethrough, the center wall having a threaded throughbore, and two side walls, each side wall extending orthogonally from opposite edges of the front wall;

an adjustment bolt extending through the throughbore in the center wall to contact said receiver tube, said adjustment bolt being movable within the throughbore to move the center wall of said collar away from said receiver tube to draw the opening in the front wall against the shank portion of said mount and force the shank portion of said mount against an inner wall of said receiver tube; and mounting means coupled with said adjustment bolt to maintain the position of said collar on said receiver tube.

9. The system of claim 8, wherein said receiver tube has a reinforcing lip disposed around the opening of the receiver tube, said at least one side wall extending over a portion of the reinforcing lip, and wherein the throughbore is positioned on the center wall such that the adjustment bolt contacts the receiver tube behind the reinforcing lip.

10. The system of claim 8, wherein said mounting means includes a lock nut and a second nut, said second nut being positioned in between said center wall and a wall of the receiver tube, wherein said adjustment bolt is threaded through said lock nut and through the throughbore in the center wall into said second nut and wherein said lock nut is tightened against said center wall to maintain the position of the collar on the receiver tube.

11. A method for preventing rattle in a receiver-style hitch having a receiver tube and a mount, the method comprising:

placing a collar having a front wall and a center wall extending orthogonally from an edge of the front wall and at least one side wall orthogonal to the front wall and the center wall over an end of the receiver tube;

inserting a shank portion of the mount through an opening in the front wall of the collar into the receiver tube;

threading an adjustment bolt through a threaded throughbore in the center wall of the collar to contact the receiver tube and move the center wall of said collar away from the receiver tube to draw the opening in the front wall against the shank portion of the mount and force the shank portion of the mount against an inner wall of the receiver tube; and tightening a mounting means coupled with said adjustment bolt to maintain the position of the collar on the receiver tube.

12. The method of claim 11, wherein the tightening step includes adjusting a lock nut positioned between the center wall of the collar and a head of the adjustment bolt and adjusting a second nut positioned between said center wall and a wall of the receiver tube and tightening the lock nut against the center wall to eliminate movement of the shank inside the receiver tube.

13. The method of claim 12, wherein the threading step includes threading the adjustment bolt such that the bolt contacts the receiver tube behind a reinforcing lip that is disposed around the opening of the receiver tube.

14. A system for preventing rattling in a hitch, comprising:

a mount having a shank portion;

a receiver tube having an opening to receive the shank portion of said mount and a reinforced lip disposed around the opening;

a collar having a front wall, a center wall extending orthogonally from an edge of the front wall, the front wall having an opening to receive the shank portion of said mount therethrough, the center wall having a threaded throughbore, and two side walls, each side wall extending orthogonally from opposite edges of the front wall and extending over a portion of the reinforcing lip on said receiver tube;

an adjustment bolt extending through the throughbore in the center wall to contact said receiver tube behind the reinforcing lip, said adjustment bolt being movable within the throughbore to move the center wall of said collar away from said receiver tube to draw the opening in the front wall against the shank portion of said mount and force the shank portion of said mount against an inner wall of said receiver tube;

a lock nut positioned in between a head of said adjustment bolt and the center wall of said collar; and a second nut positioned in between said center wall and a wall of said receiver tube, wherein said adjustment bolt is threaded through said lock nut and through the throughbore in the center wall into said second nut and wherein said lock nut is tightened against said center wall to maintain the position of the shank inside the receiver tube.

15. The system of claim 14, wherein said collar is placed on said receiver tube such that the center wall and said adjustment bolt are located on a top surface of said receiver tube.

16. The system of claim 14, wherein said collar is placed on said receiver tube such that the center wall and said adjustment bolt are located on a side surface of said receiver tube.

17. The system of claim 14, wherein said collar is placed on said receiver tube such that the center wall and said adjustment bolt are located on a bottom surface of said receiver tube.

18. An anti-rattle device for use with a receiver-style hitch having a receiver tube and a mount, the device comprising:

a collar having a front wall and a center wall extending orthogonally from an edge of the front wall, and two side walls, each extending orthogonally from opposite edges of the front wall, the front wall having an opening to receive the mount therethrough, the center wall having a threaded throughbore;

an adjustment bolt extending through the throughbore in the center wall to contact the receiver tube, said adjustment bolt being movable within the throughbore to move the center wall of said collar away from the receiver tube to draw the opening in the front wall against a shank portion of the mount and force the shank portion of the mount against an inner wall of the receiver tube; and mounting means coupled with said adjustment bolt to maintain the position of said collar on the receiver tube.

19. The device of claim 18, wherein said collar is formed by stamping a flat piece of metal, bending the flat piece of metal at substantially right angles to form the center walls and the side walls, and welding the center wall and the side walls thus formed at their respective edges.

20. An anti-rattle device for use with a receiver-style hitch having a receiver tube and a mount, the device comprising:

a collar having a front wall and a center wall extending orthogonally from an edge of the front wall, and at least one side wall orthogonal to the front wall and the center wall, the front wall having an opening to receive the mount therethrough, the center wall having a threaded throughbore;

an adjustment bolt extending through the throughbore in the center wall to contact the receiver tube, said adjustment bolt being movable within the throughbore to move the center wall of said collar away from the receiver tube to draw the opening in the front wall against a shank portion of the mount and force the shank portion of the mount against an inner wall of the receiver tube; and mounting means coupled with said adjustment bolt to maintain the position of said collar on the receiver tube, wherein said mounting means includes a lock nut, wherein said adjustment bolt is threaded through said lock nut and through the throughbore in the center wall and wherein said lock nut is tightened against said center wall to maintain the position of the collar on the receiver tube.

* * * * *